United States Patent [19]

Alexandres

[11] Patent Number: 5,418,088
[45] Date of Patent: May 23, 1995

[54] LASER INSCRIBED BATTERY CASE

[75] Inventor: Richard B. Alexandres, Clear Lake, Iowa

[73] Assignee: Alexander Manufacturing Company, Mason City, Iowa

[21] Appl. No.: 132,381

[22] Filed: Oct. 6, 1993

[51] Int. Cl.6 .......................... H01M 2/04; H01M 2/02
[52] U.S. Cl. ......................................... 429/175; 429/1; 429/176; 372/10
[58] Field of Search .................... 429/1, 175, 163, 176, 429/90, 122; 372/10; 219/121.69

[56] References Cited

U.S. PATENT DOCUMENTS

| | | | |
|---|---|---|---|
| 4,918,704 | 4/1990 | Caprara et al. | 372/10 |
| 5,016,251 | 5/1991 | D'Arcy | 372/10 |
| 5,202,199 | 4/1993 | Mitzutani et al. | 429/1 |

Primary Examiner—John S. Maples
Attorney, Agent, or Firm—Hugh D. Jaeger

[57] ABSTRACT

Laser inscribing system for one step labeling, dating or applying appropriate artwork to a plastic battery enclosure case. A computer controlled laser gun directs a laser beam to inscribe pertinent data on a plastic battery enclosure case.

1 Claim, 2 Drawing Sheets

LASER INSCRIBED BATTERY CASE

BACKGROUND OF THE INVENTION

1. Field of the Invention

The present invention pertains to a battery enclosure case, and more particularly pertains to a method of applying information to a battery enclosure case.

2. Description of the Prior Art

The prior art devices for labeling of battery enclosure packages for the containment of multiple batteries have consisted of devices such as labels, hot stamp embossing, painted on information and the like. Often labels would fade or be worn away with battery use thus rendering contained data unreadable or even nonexistent should the label peel off. Hot stamp embossing often involved a multiple step process where the model number might be applied in one process and the manufacturer date and/or serial number might be applied in another separate process. Often hot stamp labeling would cause smoke to be produced in the hot stamp process which would be harmful to the process operator. Other methods of labeling, such as by using surface attachment such as by paint, dot matrix generation or the like, produced images which could be easily worn off of a surface by constant use. The use of prior art marking devices proved to be labor and capital intensive in system set up and often required lengthy changes to present or new tooling to include or change new information.

Clearly, what is needed is a quick one step process of labeling a battery enclosure case which is permanent in nature. The present invention provides such a device for one step lasting and durable labeling of a plastic battery enclosure case. Laser inscribing provides for a permanent marking, provides for rapid marking and also provides for a readily changeable marking input which is readily changed by the computerized controller. Also the change can be readily made merely by inputting required characters from a computerized control unit.

SUMMARY OF THE INVENTION

The present invention includes a method of one step laser inscribing of all pertinent information on any one surface of a battery enclosure case.

According to one embodiment of the present invention, there is provided a Nd:YAG or other suitable laser gun which is aligned over a surface of a battery enclosure case to inscribe data or artwork upon the battery enclosure case. A computerized control unit controls the laser gun and thus the information inscribed upon the battery enclosure case.

Battery enclosures are conveyed or otherwise handled to be positioned beneath the laser gun for inscribing.

One significant aspect and feature of the present invention is a battery enclosure case which is laser inscribed with pertinent information such as model number, manufacture date, name of manufacturer and the like.

Another significant aspect and feature of the present invention is a one step labeling process instead of a multiple step process as in prior art devices.

Another significant aspect and feature of the present invention is the use of a permanent laser labeling method which remains permanently embossed into the surface of a battery enclosure case.

Having thus described one embodiment of the present invention, it is the principal object hereof to provide a one step laser inscriber for application of pertinent data or logos upon a battery enclosure case.

BRIEF DESCRIPTION OF THE DRAWINGS

FIG. I illustrates a front view of the laser inscriber system, and.

DETAILED DESCRIPTION OF PREFERRED EMBODIMENTS

Figure 1:
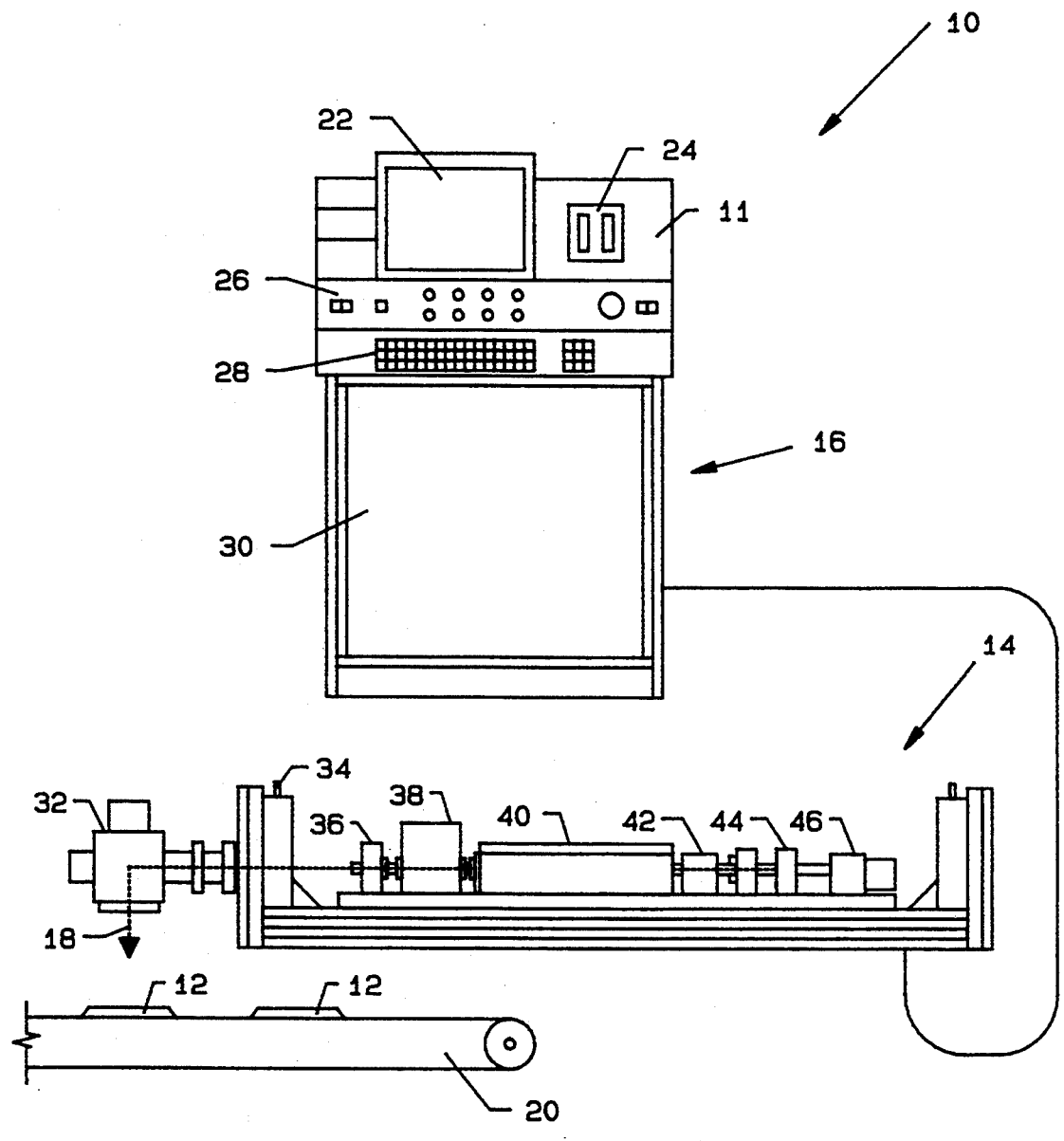

FIG. I illustrates a laser inscriber system 10 for simultaneous one step laser inscribing of dates and model and/or serial numbers or other pertinent information on a battery enclosure case 12 consisting of plastic, metal or other suitable material. Other inscribing such as a logo or other desired artwork may also be inscribed on any surface of the battery enclosure case 12. A laser gun 14 is controlled by a control unit 16 to direct a laser inscribing beam 18 about a properly oriented surface of the plastic battery enclosure case 12. The control 16 controls the movement of the laser inscribing beam 18 in an x-y axis on the plastic battery enclosure case 12. Related data such as number of units inscribed, character size and width and other pertinent information is also stored by the computer for future reference to related production data. The plastic battery enclosure case 12 can be positioned by a conveyer 20 or other suitable handling devices so that any desired surface may be inscribed by the laser beam 18. In the alternative, the plastic battery enclosure case 12 can be manually positioned beneath the laser beam 18 in a jig or other guidance or alignment device for laser inscription. Laser inscription nominally incorporates a short time period such as 3 to 4 seconds to completely inscribe a battery case. The laser beam melts approximately 9 to 3 thousandths of an inch into the surface of the battery case during the inscription process.

Figure 2:
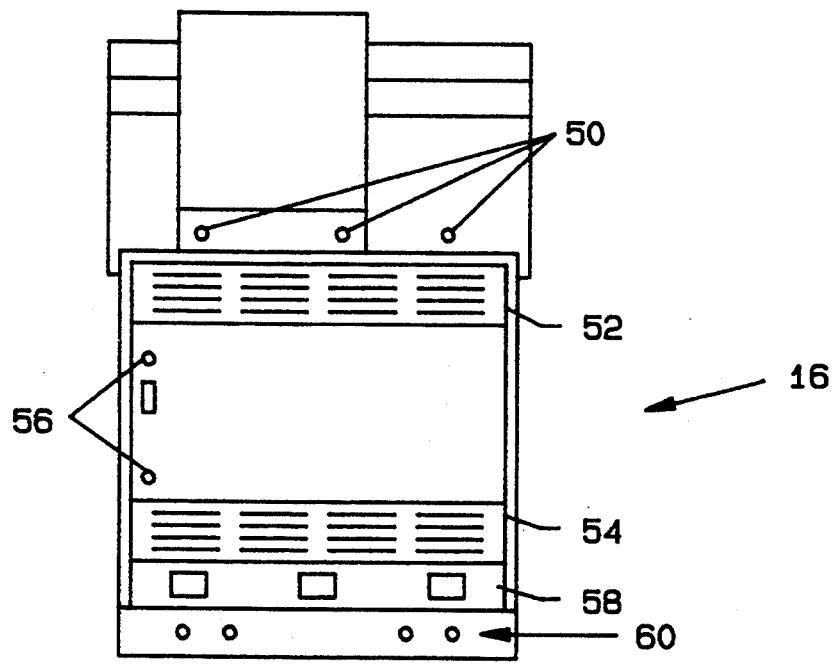
FIG. 2 illustrates the rear view of the control unit.

The laser control unit 10 is computer based and includes a computer 11 such as an IBM compatible multiprocess computer consisting of an Intel 80986 with 1 MB RAM for user interface and an Intel 809.86 for the working controller, a CRT display 22, a floppy disk drive 24, a control and indicator panel 26, a keyboard 28, a laser cooling system access door 30 and other associated input and output terminals as illustrated in FIG. 2. The laser gun 14 includes a marking head 32, an emission indicator 34, a front mirror 36, an aperture and safety shutter 38, a laser head 40, a q-switch 42, a rear mirror 44 and a photodiode 46. The laser beam 18 generally covers a suitable size field such as but not limited to a circular shape having a radius of 3 or 5.6 mils or a square having side dimensions of 4 inches. The marking field is a cartesian coordinate system having its origin at the center of the marking area and having x and y coordinates, and also includes an optical part alignment and focus aid.

The system 10 provides for a plurality of techniques for inscribing and is differentiated by the maximum temperature on the material surface. Surface annealing is accomplished by comparatively low temperatures applied to the surface to be annealed and the laser beam produces a sharp line contrasting the surrounding material with a very shallow penetration. Another technique is that of surface melting where the material is brought to a molten state. Depth penetrations of less than 0.001 inch are normally attainable at a reasonable speed. Another technique is that of laser engraving where the material is vaporized with each ensuing pulse of the laser beam. The laser beam can be operated at a fast speed and overlapped on successive pulses to achieve a desired depth of approximately 0.003 to 0.004 inch. A plurality of character fonts such as, but not limited to Helvetica, OCR-A and bar code-39 can be incorporated in any of the inscribing techniques used. Graphics are user programmable via the control unit computer 11.

A control unit 10, such as a 50 watt Signature model laser manufactured by Control Laser Corporation, by purpose of example and illustration, is incorporated to inscribe the recycle logo, the battery type such as Ni—Cd, alkaline, nickel metal hydride, safe disposal information, company name, voltage, polarity, date, serial number, model number, production run, company logo or any other desired pertinent information as desired or required. Battery enclosure cases 12 can be laser inscribed with a battery enclosed within the battery enclosure cases as required, or can be inscribed without an enclosed battery therein depending on the stage of the manufacturing process.

FIG. 2 illustrates the rear side of the control unit 16 where all numerals correspond to those elements previously described. Included in this view are a plurality of top cover releases 50, exhaust fans 52, inlet fans 54, door releases 56, power and laser umbilical connections 58 and external water connections 60.

MODE OF OPERATION

The laser inscriber system for batteries requires that system power and the water cooling system be first activated. The keyboard 28 is used to input desired information to be inscribed onto the battery enclosure cases to the computer 11. The information included, but not limited to recycle logo, battery type such as Ni—Cd, alkaline, nickel metal hydride, safe disposal information, company name, voltage, polarity, date, serial number, model number, production run, company logo or any other desired pertinent information. Fonts and script size, can be chosen on the computer 11 as well as placement of script or logos upon the battery enclosure surfaces. Other parameters are chosen such as laser strength, speed of the laser beam across the surface to be inscribed, width of laser beam, repeat of laser beam across a desired path and other required parameters. Another feature is the ability to laser inscribe logos from imported DXF files so that custom logos can be applied. Information is then fed to the laser gun 14 by the computer 11 for laser inscription.

We claim:

1. Method of inscribing indicia onto a plastic surface of a rechargeable battery enclosure case comprising:
   a. providing a laser gun and a control system for controlling said laser gun;
   b. inputting to said control system a graphic description of said indicia;
   c. aligning said laser gun with said plastic surface; and,
   d. directing a laser beam from said laser gun to said surface to bring areas to be inscribed to a molten state.

* * * * *